UNITED STATES PATENT OFFICE.

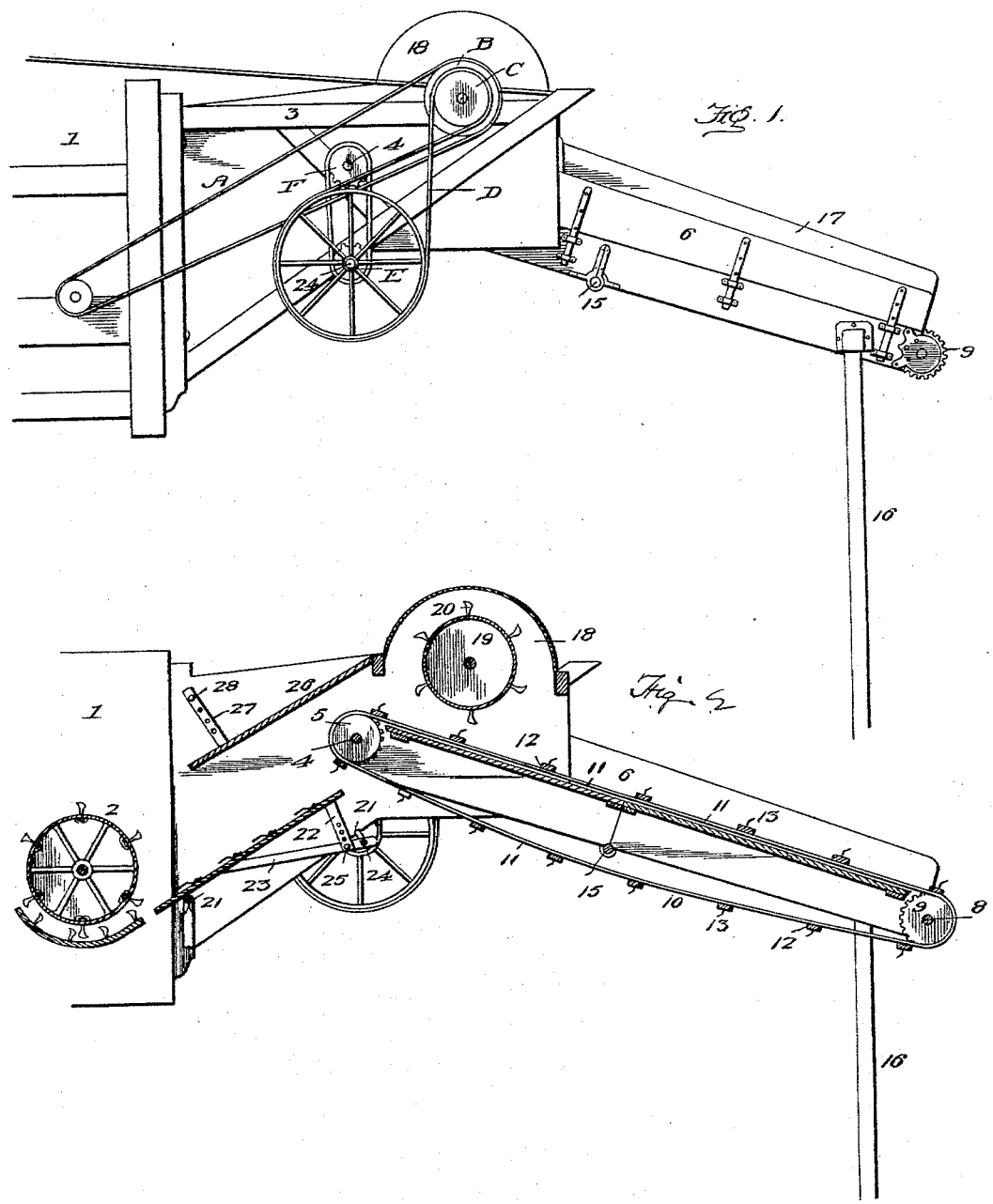

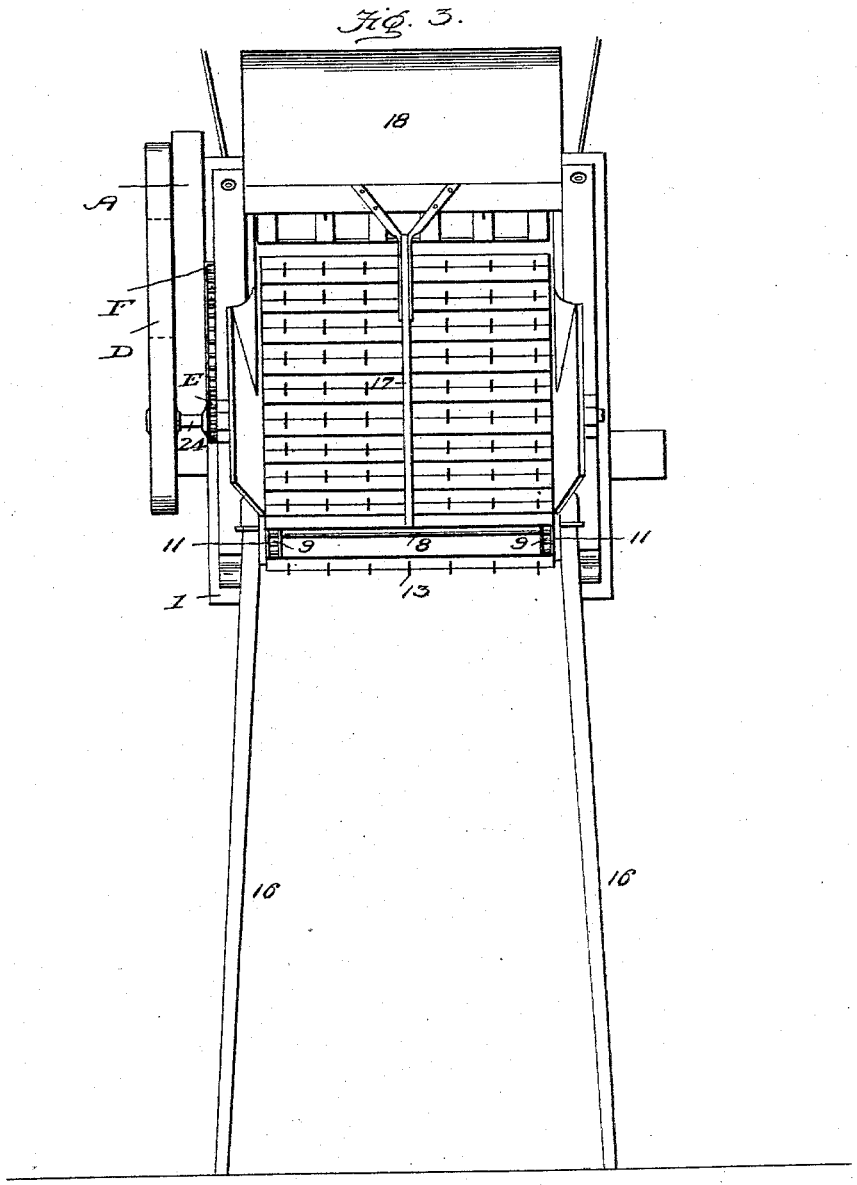

JOHN P. OLSON AND OLOF ISAACSON, OF ASSARIA, KANSAS.

BAND-CUTTER AND FEEDER.

SPECIFICATION forming part of Letters Patent No. 589,534, dated September 7, 1897.

Application filed March 10, 1897. Serial No. 626,834. (No model.)

*To all whom it may concern:*

Be it known that we, JOHN P. OLSON and OLOF ISAACSON, citizens of the United States, residing at Assaria, in the county of Saline and State of Kansas, have invented certain new and useful Improvements in Band-Cutters and Feeders; and we do declare the following to be a full, clear, and exact description of the invention, such as will enable others skilled in the art to which it appertains to make and use the same.

Our invention relates to a band-cutter and feeder for threshing-machines; and the object is to simplify the construction and to provide a band-cutter and feeder which will effectively feed the bound or unbound grain to the threshing-cylinder in an evenly-scattered mass.

A further object is to provide means for cutting the bands of bound grain and delivering the grain to the cylinder.

With these objects in view the invention consists of certain features of construction and combination of parts, which will be hereinafter fully described and claimed.

In the accompanying drawings, Figure 1 is a side view of a portion of the rear end of a threshing-machine equipped with our invention. Fig. 2 is a longitudinal vertical sectional view through the same, and Fig. 3 is a front view of the band-cutter and feeder.

In the drawings, 1 denotes the rear end of a threshing-machine, and 2 its threshing-cylinder.

3 denotes the bracket-supporting arms secured to the forward end of the threshing-machine. Journaled in the bracket-arms is a shaft 4, provided with sprockets 5, and supported upon this shaft are the side pieces 6 of the band-feeder, which is provided with a bottom 7 and at its lower forward end with a shaft 8, having sprocket-wheels 9.

10 denotes the conveyer, which consists of endless bands or chains 11, meshing with the sprocket-wheels and connected together by slats 12, which are provided with upwardly-extending prongs 13, having their extremities bent forwardly for obvious reasons. The said side pieces are hinged together intermediate their length, as shown at 15, so that the forward section may be swung up over and upon the rear section when not in use. When in use, this section is supported by legs 16.

17 denotes a "divide" which extends longitudinally of the conveyer and is only employed when feeding bound grain.

Journaled in the casing 18 above the conveyer and considerably in advance of its rear inclined end is a cylinder 19, provided with a series of stirrer and cutting teeth 20, and to the rear of the upper end of the conveyer is a "bucking-board," which is slightly below the upper end of the conveyer and leads to the threshing-cylinder. This bucking-board is provided with a series of teeth inclining or extending toward the cylinder for obvious reasons. The rear end of the bucking-board is bridled upon the shaft 21, while its forward end is provided with a vertical arm 22, which is connected to a brace-arm 23, journaled upon a crank-arm 24, by means of which the board is given a curvilinear motion to force the grain in a finely-divided state to the threshing-cylinder. The forward end of the bucking-board is made vertically adjustable by means of providing a vertical row of apertures in the arm 22, which may be engaged by pins or bolts 25.

26 denotes a cover to the chamber and is located above the upper end of the conveyer and above the bucking-board and is made vertically adjustable by the perforated bar and bolt 27 and 28, respectively.

By extending the rear end of the conveyer rearwardly beyond the band-cutter all liability of the unbound grain being hurled in tangled masses to the cylinder is entirely obviated, and by providing the adjustable cover F when feeding unbound grain all liability of the grain being thrown and piled up against the head of the thresher is prevented, and said board may be adjusted to limit the amount of grain fed to the cylinder.

The operative parts of our invention may be driven in any well-known manner, and, as shown in the accompanying drawings, the power is taken from the cylinder-shaft by a belt A to a pulley B on the band-cutter shaft, which is provided with a similar pulley C, which is engaged by a belt D, passing around the crank-shaft, which is provided with a sprocket-wheel E, having a chain connection with a sprocket-wheel F on the upper rear shaft of the conveyer.

Having thus described our invention, what we claim, and desire to secure by Letters Patent, is—

A band-cutter and feeder comprising an inclined endless conveyer composed of two sections hinged together, the rotary cutter arranged above and in advance of the rear end of said conveyer, a downwardly-inclined bucking-board arranged below and to the rear of the conveyer and leading to the threshing-cylinder, a cover over the rotary cutter, a cover leading therefrom and extending over the bucking-board, the front end of said bucking-board and the rear end of the extension-cover being vertically adjustable by perforated bars and bolts to always retain a parallel relation, and means for actuating the cutter, conveyer and bucking-board substantially as set forth.

In testimony whereof we hereunto affix our signatures in presence of two witnesses.

JOHN P. OLSON.
OLOF ISAACSON.

Witnesses:
JOHN PETERSON,
E. E. LINDERHOLM.